(12) United States Patent
Austen et al.

(10) Patent No.: US 6,845,470 B2
(45) Date of Patent: Jan. 18, 2005

(54) METHOD AND SYSTEM TO IDENTIFY A MEMORY CORRUPTION SOURCE WITHIN A MULTIPROCESSOR SYSTEM

(75) Inventors: Christopher Harry Austen, Austin, TX (US); Van Hoa Lee, Cedar Park, TX (US); Milton Devon Miller, II, Austin, TX (US); Douglas Wayne Oliver, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 444 days.

(21) Appl. No.: 10/087,920

(22) Filed: Feb. 27, 2002

(65) Prior Publication Data

US 2003/0163758 A1 Aug. 28, 2003

(51) Int. Cl.[7] .................................................. G06F 11/00
(52) U.S. Cl. ......................... 714/38; 714/10; 714/768; 714/54; 717/128; 717/131
(58) Field of Search ............................... 714/54, 37, 38, 714/42, 765, 10, 8; 717/131, 128

(56) References Cited

U.S. PATENT DOCUMENTS

| | | | | |
|---|---|---|---|---|
| 5,513,315 A | * | 4/1996 | Tierney et al. ................ | 714/37 |
| 6,009,258 A | * | 12/1999 | Elliott ........................ | 703/22 |
| 6,230,284 B1 | * | 5/2001 | Lillevold .................... | 714/13 |
| 6,412,082 B1 | * | 6/2002 | Matsuura ..................... | 714/38 |
| 6,502,208 B1 | * | 12/2002 | McLaughlin et al. ......... | 714/25 |
| 6,591,379 B1 | * | 7/2003 | LeVine et al. ............... | 714/38 |
| 6,675,295 B1 | * | 1/2004 | Marcelais et al. ............ | 713/2 |
| 6,701,454 B1 | * | 3/2004 | Fischer et al. ............... | 714/15 |
| 6,772,367 B1 | * | 8/2004 | Tarafdar et al. .............. | 714/11 |
| 6,795,916 B2 | * | 9/2004 | Tung ............................ | 713/2 |
| 2002/0133738 A1 | * | 9/2002 | Zeigler et al. ................ | 714/6 |
| 2003/0046612 A1 | * | 3/2003 | Grey ........................... | 714/38 |
| 2003/0084377 A1 | * | 5/2003 | Parks et al. .................. | 714/38 |

* cited by examiner

Primary Examiner—Robert Beausoliel
Assistant Examiner—Christopher McCarthy
(74) Attorney, Agent, or Firm—Mark E. McBurney; Dillon & Yudell LLP (57) ABSTRACT

A method and system for identifying a source of a corrupt data in a memory in a multiprocessor computer system. When a computer program stores corrupt data causing a program failure or a system crash, the corrupt data and its address are identified. The multiprocessor computer system is shut down, and the corrupt data is cleared from the memory. Before fully re-booting the multiprocessor computer system, a processor is selected from the multiprocessor computer system to load and run monitor code designed to monitor the location where the corrupt data was stored. The program that previously stored the corrupt data is restarted, and the selected processor detects any re-storage of the corrupt data in the same memory address. All processors in the computer system are then immediately suspended. The registers of all processors suspected of storing corrupt data are inspected to determine the source of the corrupt data.

18 Claims, 5 Drawing Sheets

METHOD AND SYSTEM TO IDENTIFY A MEMORY CORRUPTION SOURCE WITHIN A MULTIPROCESSOR SYSTEM

BACKGROUND OF THE INVENTION

1. Technical Field

The present invention relates in general to the field of computers, and in particular, to the field of data storage. Still more particularly, the present invention relates to an improved method and system for identifying a source of corrupt data in memory.

2. Description of the Related Art

As computer processing becomes more complex, the need for higher computer performance increases. One method of addressing this need is the use of multiple processors, executing the same or different programs, within a computing system. While many architectures use multiple processors, such architectures may be categorized as either Logical Partition (LPAR) computer systems or non-LPAR computer systems.

An LPAR computer system partitions its multiple processors into discrete processing partitions. Each processing partition may be a single processor, or may be a group of processors. Each processing partition operates under a single operating system (OS), and typically runs one program at a time, although simultaneous multiprocessing (a.k.a. multitasking) of multiple programs within a processing partition is common. The OS of each processing partition may be the same or different OS used by other processing partitions, and the processing partitions may run the same or different programs as other processing partitions. Each processing partition has its own private memory, which is either a separate physical memory or a reserved partition of a main memory in the LPAR computer system. When a processing partition has multiple processors executing a single program, this process if referred to as parallel processing.

A non-LPAR computer system simultaneously uses multiple processors to execute a single program operating under a common OS. Unlike the LPAR computer system, the non-LPAR computer system shares a single memory address space, typically a memory partition in main memory. If each processor takes the same time to access main memory, the non-LPAR computer system is called a uniform memory access (UMA) multiprocessor or symmetric multiprocessor (SMP). If memory accesses are faster for some processors compared to others within the non-LPAR computer system, the computer system is called a nonuniform memory access (NUMA) multiprocessor.

As described above, LPAR computer systems are designed such that each processing partition uses a separate memory or, more typically, a partition of main memory. The LPAR architecture protocol prohibits one processing partition from using memory in another processing partition's memory partition. However, a hardware or software error can sometimes occur, resulting in corrupt data being stored in an unauthorized memory address location.

During execution of a computer program, valid data may be written several times to a memory address. However, when corrupt data is stored to that memory address, program failure often results. In an LPAR computer system, the corrupt data is often the result of one logical partition storing, either directly or indirectly, data to another logical partition's memory. After program failure, the corrupt data and the main memory address in which the corrupt data is stored can be identified. However, conventional debugging software is unable to determine the cause and source of the corrupt data for several reasons.

First, loading debugging software in a continuous main memory typically causes an uninitialized pointer problem. That is, loading debugging software in main memory often causes the memory location where the corrupt data originally occurred to move, thus making monitoring future corrupt data stores difficult, if not impossible. Second, in an LPAR computer system, prior art debugging software is OS dependent, and thus is unable to communicate cross logical partitions. That is, debugging software under a specific OS is not able to monitor a memory of a first logical partition operating under a different OS. Further, the debugging software cannot access a processor of a second logical partition that is the source of the corrupt data if it is also under a different OS from that used by the debugging software. Finally, a hardware Data Address Break (DABR) is unusable since many valid data writes to a memory address may occur. That is, the mere storage of data to the corrupt data address may or may not be the storage of corrupt data, thus making use of a DABR flag unhelpful.

In the prior art, the offending processor that erroneously stored corrupt data to a prohibited memory address is sometimes identified using hardware called a logic analyzer. A logic analyzer records a processor's operation history, including data storage, by measuring activity on external pins of the processor. The logic analyzer is an intelligent piece of hardware that physically fits over a processor to contact the processor's pins, and creates a log of signals at the pins, including data storage instructions. However, most multiprocessor systems do not have the required amount of physical space needed to position a logic analyzer on top of a processor, and thus cannot be used.

Therefore, there exists a need for a tool that has unrestricted access to all memory on a system and the ability to identify a specific value of a corrupt data at a specific memory address. The tool should have the further ability to identify the source of the corrupt data.

SUMMARY OF THE INVENTION

The present invention is a method and system for identifying a source of a corrupt data in a memory in a multiprocessor computer system. When a computer program fails, debugging software locates and identifies the corrupt data that caused a program failure (crash). The multiprocessor computer system is shut down, and the corrupt data is cleared from the memory. During a restart of the multiprocessor computer system, a processor is selected to load and run monitor code designed to monitor the location where the corrupt data was stored.

The crashed system is then restarted. When the selected processor detects re-storage of the corrupt data in the same memory address, all system operations are immediately suspended. The registers of all suspected processors that may have stored the corrupt data are inspected to determine the source of the corrupt data, thus allowing the problem to be corrected.

The present invention is particularly useful in logical partition (LPAR) computer systems that prohibit access to memory partitions by processors using an OS that is not permitted by the memory partition. The selected processor used to monitor the memory address for the corrupt data is isolated before being loaded with any OS. Monitoring code, which is independent of any OS, is loaded into the selected processor, which is able to cross different memory partitions.

Thus, the selected processor is able to monitor the content of any memory location in any memory partition in an LPAR computer system.

The above, as well as additional objectives, features and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
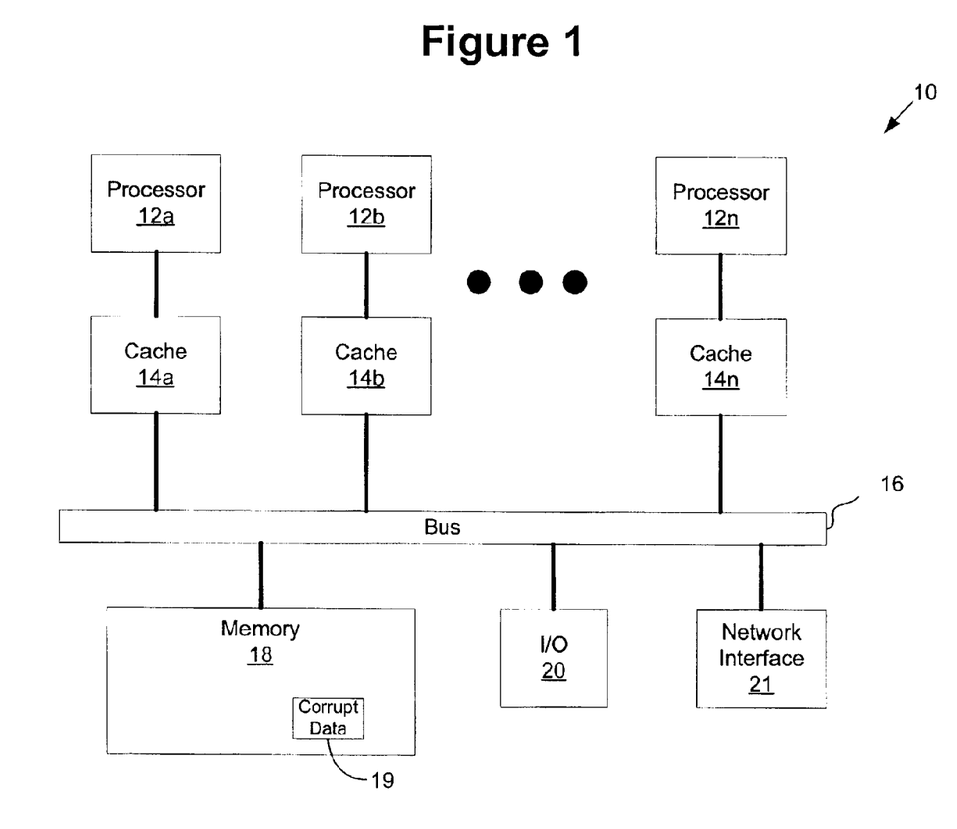
FIG. 1 depicts an exemplary non-logical partition (non-LPAR) computer system used with the present invention.

With reference now to the drawings and in particular to FIG. 1, there is depicted an exemplary non-logical partition (non-LPAR) computer system configured as a symmetric multiprocessor (SMP) system 10. SMP system 10 includes multiple processors 12a–12n, each processor 12 having a respective cache memory 14a–14n. Processors 12 and cache memories 14 are connected to a single bus 16, which connects to a main memory 18, an input/output (I/O) interface 20, and a network interface 21. Cache memories 14 may be level 1, level 2 or higher level cache memory that references main memory 18 using any method known in the art, including direct mapping. I/O interface 20 provides an interface to I/O devices, including monitors, keyboards, pointers, printers, etc. Network interface 21 provides an interface to connect SMP system 10 to other computer devices via a network (not shown), such as a local-area network (LAN), wide-area network (WAN) or Internet.

When using parallel processing software, SMP system 10 may encounter corrupt data 19 within main memory 18. Corrupt data 19 may have its source in any processor 12, but initially that source will be unknown to the user debugging the program. In a process described further and illustrated in FIG. 4, one of the processors 12, which is a least affected processor, is utilized to monitor main memory 18 for corrupt data 19 at a specific memory address in main memory 18.

Figure 2:
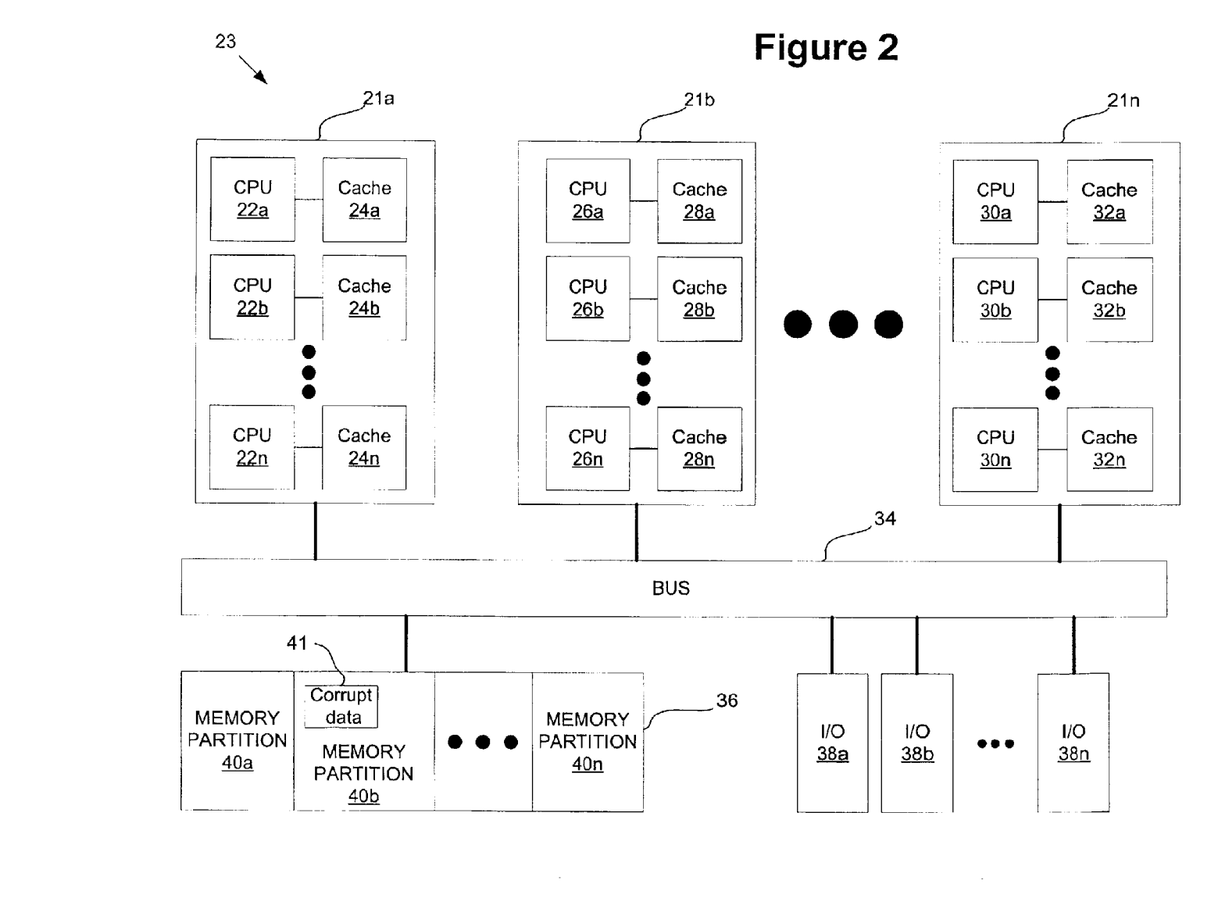
FIG. 2 illustrates an exemplary logical partition (LPAR) computer system used with the present invention.
Figure 3:
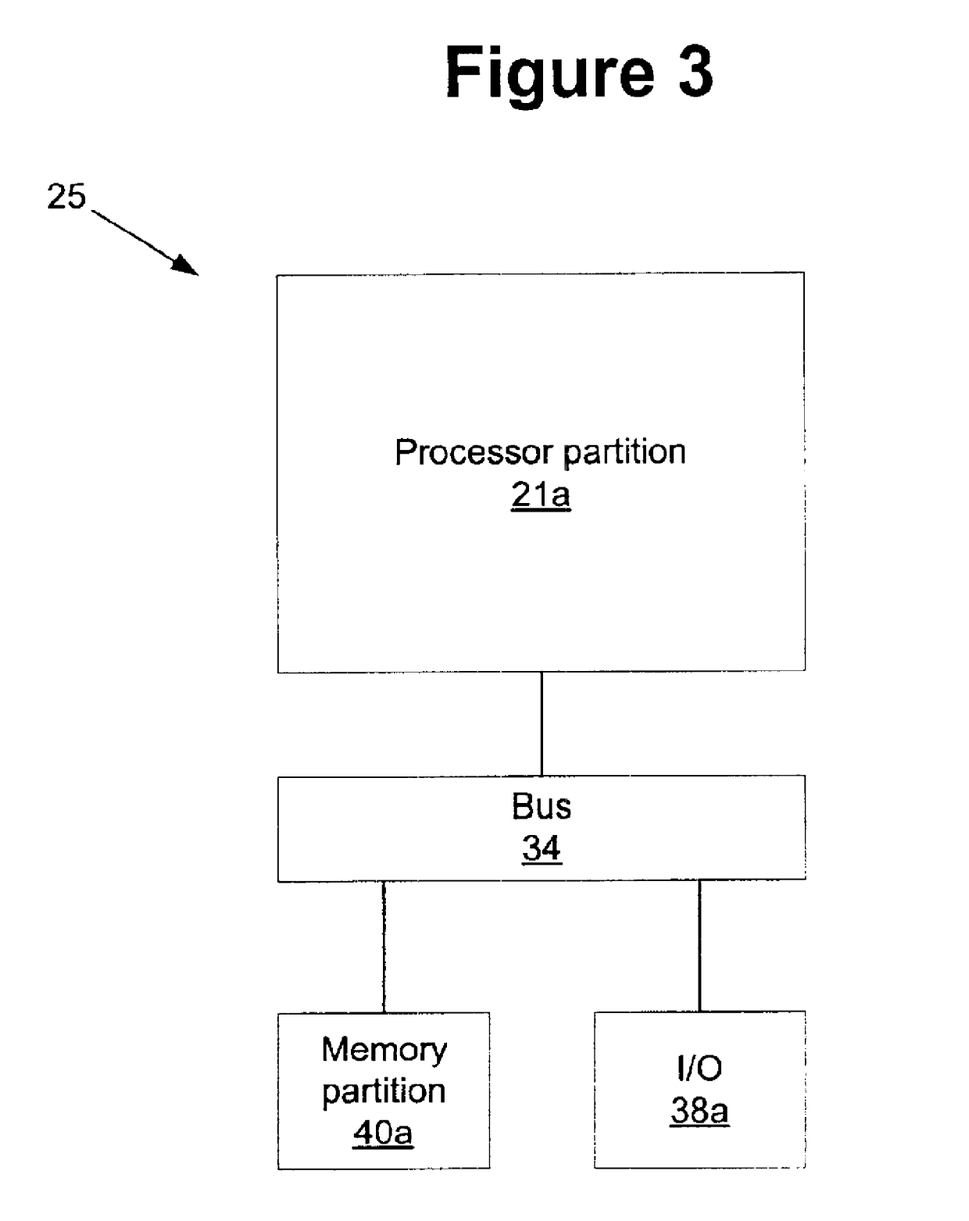
FIG. 3 depicts an exemplary logical partition in the LPAR computer system illustrated in FIG. 2.

With reference now to FIG. 2, there is illustrated a block diagram of an exemplary logical partition (LPAR) computer system 23. LPAR computer system 23 includes multiple logical partitions, one of which, logical partition 25, is depicted in FIG. 3. Logical partition 25 includes a processor partition 21a, a memory partition 40a and preferably an I/O 38a. Memory partition 40a and I/O 38a connect to processor partition 21a via a bus 34 as depicted. Processor partitions 21, memory partitions 40, and I/O's 38 are described in further detail below.

Returning again to FIG. 2, LPAR computer system 23 includes multiple processor partitions 21a–21n. In the example shown, each processor partition 21 has multiple central processor units (CPU's). Alternatively, each processor partition may have only a single CPU. In the exemplary system depicted, each CPU in each processor partition 21 has a cache memory 24. As depicted, processor partition 21a includes CPU's 22a–22n, each CPU 22 having an associated cache memory 24a–24n; processor partition 21b includes CPU's 26a–26n, each CPU 26 having an associated cache memory 28a–28n; and processor partition 21n includes CPU's 30a–30n, each CPU 30 having an associated cache memory 32a–32n.

Each processor partition 21 is connected to bus 34, which is further connected to a main memory 36 and an I/O interface 38. I/O interface 38 serves an analogous function as I/O interface 20 described for the non-LPAR computer system depicted in FIG. 1. As depicted in FIG. 2, each processor partition 21 has its own I/O 38, such that processor partition 21a uses I/O 38a, processor partition 21b uses I/O 38b, and processor partition 21n uses I/O 38n.

Main memory 36 is partitioned into memory partitions 40a–40n, such that each processor partition 21 has its own private memory partition 40. Thus processor partition 21a uses memory partition 40a, processor partition 21b uses memory partition 40b, and processor partition 21n uses memory partition 40n. As will be described below, main memory 36 may include corrupt data 41 at a specific address within one of the memory partitions 40. As discussed below, one of the CPU's in one of the processor partitions 21 will be isolated and utilized, free of an operating system (OS), to monitor main memory 36 to identify the source of corrupt data 41.

Figure 4:
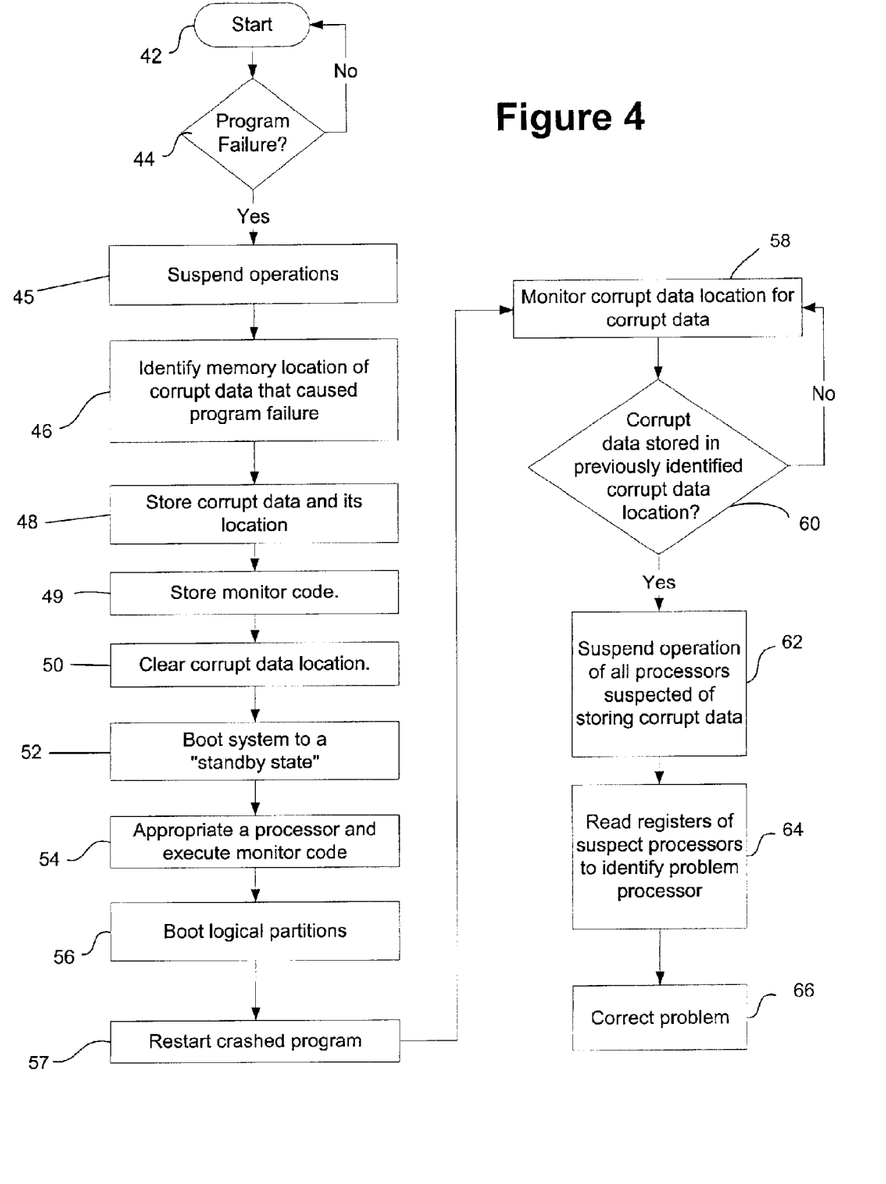
FIG. 4 is a flow chart of a process logic used by the present invention to identify a source of corrupt data in an LPAR computer system.

With reference now to FIG. 4, there is depicted a flow chart of the method for identifying corrupt data as contemplated by the present invention when used with an LPAR computer system, such as depicted in FIG. 2. Starting at block 42, a query is made in query block 44 as to whether a program failure has occurred. The program failure may be a single program running on all processing partitions in the LPAR computer system, or it may be a failure of one program out of several running simultaneously on the LPAR computer system.

If a program failure has not occurred, then no further steps are taken. If a program failure has occurred, such as a system crash or a program crash, the cause of the crash is assumed to be the result of corrupt data being stored in an unauthorized memory partition of main memory by an unauthorized processing partition. For example, as depicted in FIG. 2, one of the CPU's 22 in processing partition 21a may have caused the storage of corrupt data 41 in memory partition 40b. Under LPAR protocol, processing partition 21a should only store data in its private memory partition 40a. In the example described here, however, a CPU 22 in processing partition 21a either directly stored corrupt data 41 in memory partition 40b, or else processing partition 21a initially stored valid data in memory partition 40a. The valid data then migrated to memory partition 40b to be stored as corrupt data 41. While corrupt data 41 is shown as being in a single location in a specific memory partition 40 of main memory 36, corrupt data may be in multiple memory locations. That is, there may be corrupt data stored in several unauthorized locations in main memory, or corrupt data may be stored in both unauthorized cache memory locations as well as unauthorized main memory locations. For purposes of explanatory simplicity, it will be assumed that a single main memory address contains a single corrupt data.

As described in block 45, the operation of all processor partitions is suspended. In an alternative embodiment, the suspension of operations may be limited to only those suspected processor partitions suspected of causing the software failure. For simplicity, it will be assumed that all processing partitions are suspect, and thus are all initially suspended.

As described in block 46, the memory address of the corrupt data that caused the software failure is identified, through the use of debugging software that does not affect the address of the corrupt data, and, as shown in block 48, the corrupt data and its memory address location are stored in a memory area that will not be overwritten and will not affect the memory address of the corrupt data. As depicted in block 49, monitor code, to be run by an appropriated processor as described below in block 54 as a monitor processor, is stored, likewise in a memory location that will not be overwritten and will not affect the corrupt data memory address. In a preferred embodiment, the memory block used is the same as that previously allocated in main memory for the appropriated processor described below in block 54.

As illustrated in block 50, the memory address location that contains the corrupt data is cleared, and the LPAR computer system is then booted as described in block 52 to a "standby state." In the standby state, all processors in the LPAR computer system are in a working state, but have not been allocated to an OS. That is, each logical partition in the LPAR computer system is re-booted to a point just before loading a specific OS for each logical partition. Thus, a specific CPU in the LPAR computer system can be isolated and free of any operating system (OS), which significance is now described.

Access to memory partition in a LPAR computer system is limited to a processing partition in the same logical partition. Each logical partition operates under a single OS. Thus, preferably no OS is loaded into any logical partition until a processor from one of the logical partitions is selected to operate as a monitor processor, such that the monitor processor is OS independent to allow the monitor processor to access any memory partition.

Thus, as described in block 54, a CPU (processor) from one of the processor partitions is appropriated to monitor corrupt data found in one of the memory partitions. The processor chosen is selected from a processing partition that is the least affected by the software failure. That is, the processor chosen is preferably from the processing partition that is the least likely to have either caused or been affected by the corrupt data storage. Since access to a specific memory partition would be prohibited if the appropriated processor is running under a prohibited OS, the system re-boot is stopped before an OS is loaded. The appropriated processor is then loaded with monitoring code that is OS independent. The monitor code is a short piece of software code that instructs the appropriated processor to monitor a specific address in main memory for the storage of a specific piece of data. The specific address and specific piece of data are those stored earlier as described in block 48.

Continuing with FIG. 4, the LPAR computer system's logical partitions are booted, and the program that crashed earlier is restarted, as described in block 57. Thus all logical partition processors, except for the appropriated monitoring processor, are rebooted with an operating system to run programs that were running at the time of the software crash. The appropriated processor running the monitor code then monitors main memory to identify a storing event of the specific corrupt data at the specified memory address location, as described in block 58. When the corrupt data store event is detected, as described in block 60, all processors suspected of storing corrupt data are suspended as shown in block 62. The registers of the suspect processors are examined, as described in block 64, to identify which processor in which processor partition is responsible for storing the corrupt data in the main memory. Once the offending processor is identified, then steps are taken, as shown in block 66, to correct the problem causing the corrupt data, whether that problem is software or hardware related.

Figure 5:
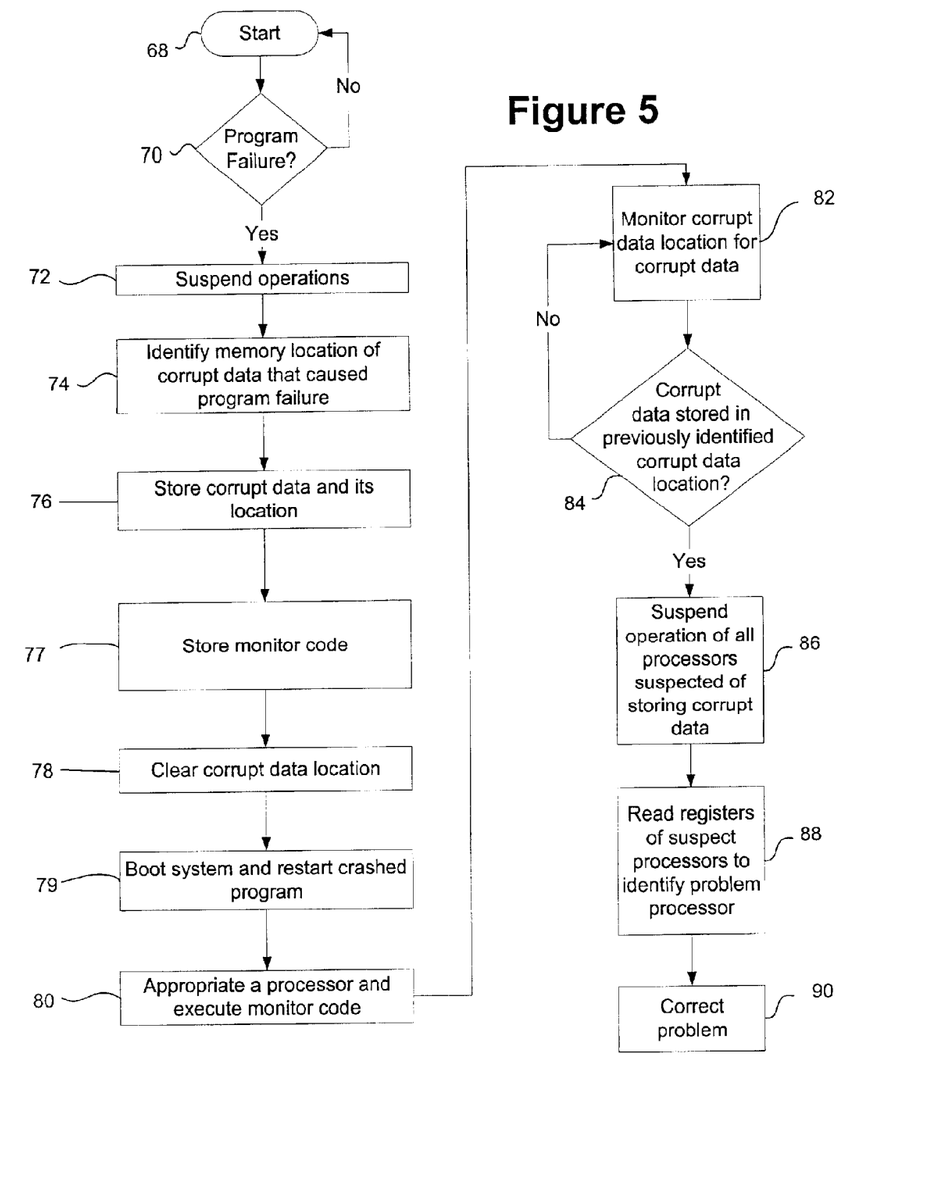
FIG. 5 is a flow chart of a process logic used by the present invention to identify a source of corrupt data in a non-LPAR computer system.

With reference now to FIG. 5, there is depicted a flow chart of the method for identifying corrupt data as contemplated by the present invention when used with a non-LPAR computer system, such as illustrated in FIG. 1. Starting at block 68, a query is made in query block 70 as to whether a program failure has occurred. The program failure may be a single program running on all processors in the non-LPAR computer system, or it may be a failure of one program out of several running simultaneously on the non-LPAR computer system.

If a program failure has not occurred, then no further steps are taken. If a program failure has occurred, such as a system crash or a program crash, the cause of the crash is assumed to be the result of corrupt data being stored in an unauthorized memory address in main memory. For example, as depicted in FIG. 1, one of the processors 12 may have caused the storage of corrupt data 19 in main memory 16. The corrupt data may have been the result of improper function of a memory controller (not shown). While corrupt data 19 is shown as being in a single location in main memory 16, corrupt data may be in multiple memory locations. That is, there may be corrupt data stored in several unauthorized locations in main memory, or corrupt data may be stored in both unauthorized cache memory locations as well as unauthorized main memory locations. For purposes of explanatory simplicity, it will be assumed that a single main memory address contains a single corrupt data.

Referring again to FIG. 5, the operation of all processors is suspended, as described in block 72. In an alternative embodiment, the suspension of operations may be limited to only those processors suspected of causing the software failure. For simplicity, it will be assumed that all processors are suspect, and thus are all initially suspended.

As described in block 74, the memory location of the corrupt data that caused the software failure is identified, preferably through the use of debugging software that does not affect the corrupt data memory address, and, as shown in block 76 and block 77, the corrupt data and its memory address location, plus the monitor code to be used by a monitor processor described below in block 80, are stored in a memory area that will not be overwritten and will not affect the corrupt data memory address. As illustrated in block 78, the memory address location that contains the corrupt data is then cleared.

As illustrated in block 79, the non-LPAR computer system is booted, and the crashed program that caused the corrupt data storage is restored. As described in block 80, a processor is then appropriated to function as the monitor processor to monitor the corrupt data memory address for re-storage of the corrupt data. Since non-LPAR computer systems do not have the OS constraints described above in FIG. 4 for LPAR computer systems, a processor from the non-LPAR computer system is simply appropriated, and executes the monitoring software stored as described in block 77, which is capable of comparing the content of a specific memory location with the known corrupt data, which was previously stored as described above in block 76.

The appropriated processor running the monitor code then monitors main memory to identify a storing event of the specific corrupt data at the specified memory address location, as described in block 82. When the corrupt data store event is detected, as described in block 84, all processors suspected of storing corrupt data are suspended, as shown in block 86. The registers of the suspect processors are examined, as described in block 88, to identify which processor in which processor partition is responsible for storing the corrupt data in the main memory. Once the offending processor is identified, then steps are taken, as shown in block 90, to correct the problem causing the corrupt data, whether that problem is software or hardware related.

The present invention is therefore able to monitor a specific memory location using a dedicated processor appropriated from multiple processors in a multiprocessor computer system. The dedicated processor is able to monitor a specific memory address location using software that is not limited by an OS. Thus, the invention works well with either a non-LPAR computer system or an LPAR computer system.

It should be appreciated that the method described above for identifying the source of corrupt data can be embodied in a computer program product in a variety of forms, and that the present invention applies equally regardless of the particular type of signal bearing media utilized to actually carry out the method described in the invention. Examples of signal bearing media include, without limitation, recordable type media such as floppy disk or compact disk, read-only-memories (CDROMs) and transmission type media such as analog or digital communication links.

While the invention has been particularly shown and described with reference to a preferred embodiment, it will be understood by those skilled in the art that various changes in form and detail may be made therein without departing from the spirit and scope of the invention.

What is claimed is:

1. A method of identifying a source of a corrupt data in a memory of a multiple processor computer, said method comprising:

identifying a memory address of the corrupt data;

storing the corrupt data and said memory address of the corrupt data in a memory location other than said memory address of the corrupt data;

clearing the corrupt data from said memory address of the corrupt data;

appropriating a monitoring processor from the multiple processor computer;

restarting a program that stored the corrupt data; and using said monitoring processor, monitoring said memory address for a re-storage of the corrupt data.

2. The method of claim 1, further comprising:

upon detecting said re-storage of the corrupt data in said memory address, suspending operation of a processor suspected of storing the corrupt data; and examining a register of said suspected processor to determine if said suspected processor stored the corrupt data in said memory address.

3. The method of claim 1, further comprising:

suspending operation of an affected processor in the computer upon a software crash caused by the corrupt data.

4. The method of claim 3, wherein the multiple processor computer is a logical partition (LPAR) computer system, said method further comprising:

prior to said appropriating said monitoring processor from the multiple processor computer, re-booting the multiple processor computer system to a standby condition such that an operating system is not loaded in said monitoring processor;

loading a monitoring program in said monitoring processor, said monitoring program capable of detecting said re-storage of the corrupt data; and completing a re-boot of the multiple processor computer system.

5. The method of claim 4, wherein the LPAR computer system includes multiple processing partitions.

6. The method of claim 5, wherein each said multiple processing partition includes multiple processors.

7. A multiple processor computer system capable of identifying a source of a corrupt data in a memory of said multiple processor computer system, said multiple processor computer system comprising:

means for identifying a memory address of the corrupt data;

means for storing the corrupt data and said memory address of the corrupt data in a memory location other than said memory address of the corrupt data;

means for clearing the corrupt data from said memory address; and a monitoring processor, appropriated from the multiple processor computer, said monitor processor being capable of monitoring, subsequent to restarting a program that stored the corrupt data, said memory address for a re-storage of the corrupt data.

8. The multiple processor computer system of claim 7, further comprising:

means for, upon detecting said re-storage of the corrupt data in said memory address, suspending operation of a processor suspected of storing the corrupt data; and means for examining a register of said suspected processor to determine if said suspected processor stored the corrupt data in said memory address.

9. The multiple processor computer system of claim 7, further comprising:

means for suspending operation of an affected processor in the computer upon a software crash caused by the corrupt data.

10. The multiple processor computer system of claim 9, wherein said multiple processor computer is a logical partition (LPAR) computer system, said multiple processor computer system further comprising:

means for, prior to said appropriating said monitoring processor from the multiple processor computer, re-booting the multiple processor computer system to a standby condition such that an operating system is not loaded in said monitoring processor;

means for loading a monitoring program in said monitoring processor, said monitoring program capable of detecting said re-storage of the corrupt data; and completing a re-boot of the multiple processor computer system.

11. The multiple processor computer system of claim 10, wherein the LPAR computer system includes multiple processing partitions.

12. The multiple processor computer system of claim 11, wherein each said multiple processing partition includes multiple processors.

13. A computer-readable medium containing computer-readable instructions, which are executable, for identifying a source of a corrupt data in a memory of a multiple processor computer, said computer program product comprising:

program code means for storing the corrupt data and a memory address of the corrupt data in a memory location, said memory location being at an address other than said memory address of the corrupt data;

program code means for clearing the corrupt data from said memory address; and program code means, loaded in a monitoring processor appropriated from the multiple processor computer, for monitoring said memory address of the corrupt data for a re-storage of the corrupt data upon restarting a program that initially stored the corrupt data.

14. The computer-readable medium of claim 13, further comprising:

program code means for, upon detecting said re-storage of the corrupt data in said memory address of the corrupt data, suspending operation of a processor suspected of storing the corrupt data; and program code means for examining a register of said suspected processor to determine if said suspected processor stored the corrupt data in said memory address of the corrupt data.

15. The computer-readable medium of claim 13, further comprising:

program code means for suspending operation of an affected processor in the computer upon a software crash caused by the corrupt data.

16. The computer-readable medium of claim 13, wherein the multiple processor computer is a logical partition (LPAR) computer system, said computer program product further comprising:

program code means for, prior to said appropriating said monitoring processor from the multiple processor computer, re-booting the multiple processor computer system to a standby condition such that an operating system is not loaded in said monitoring processor;

program code means for loading a monitoring program in said monitoring processor, said monitoring program capable of detecting said re-storage of the corrupt data; and program code means for completing a re-boot of the multiple processor computer system.

17. The computer-readable medium of claim 16, wherein the LPAR computer system includes multiple processing partitions.

18. The computer-readable medium of claim 17, wherein each said multiple processing partition includes multiple processors.

* * * * *